United States Patent Office 3,335,123
Patented Aug. 8, 1967

3,335,123
ANTISTATIC POLYOLEFIN COMPOSITION
Thomas John Adams, Bound Brook, and Christos Savides, Piscataway Township, Middlesex County, N.J., assignors to American Cyanamid Company, Stamford, Conn., a corporation of Maine
No Drawing. Filed Nov. 27, 1963, Ser. No. 326,353
3 Claims. (Cl. 260—94.9)

This invention relates to the provision of polyolefin plastic compositions having desirable antistatic properties. More particularly, it relates to a method for preventing or minimizing the accumulation of electrostatic charges on polyolefin compositions involving the incorporation therein of lauramidopropyl trimethylammonium lower alkyl sulfate represented by the Formula I:

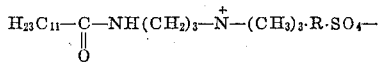

$$H_{23}C_{11}-\underset{\underset{O}{\|}}{C}-NH(CH_2)_3-\overset{+}{N}-(CH_3)_3 \cdot R \cdot SO_4-$$  I wherein R is methyl or ethyl. Additionally, this invention includes the particular polyolefin composition resulting from this method.

An antistatic agent for internal use in (as opposed to external coating on) polyolefins, must fulfill certain special requirements beginning with sufficient activity to give adequate antistatic effect at practical concentration levels. The agent must also be of a nature such that it can be quickly and uniformly incorporated into the polyolefin composition during the compounding of the latter, and, desirably, it should not impart color to the resin substrate. Various antistatic compounds have been proposed for use, including some which would expectedly foretell properties of the agent employed in our invention. United States Letters Patent Nos. 3,048,539, 2,891,878, 2,836,517, 2,626,877 and 2,626,876 are of interest in this connection.

The fact is, however, that they do not, and, unfortunately, an agent satisfying all these requirements was not known prior to the present invention.

It is an object of the present invention to provide an antistatic agent for polyolefins, which agent is readily compounded into the substrate and effectively minimizes the tendency of the polyolefin to accumulate electrostatic charges.

The present invention is based on the discovery that a compound of Formula I has excellent antistatic activity in polyolefins and, in addition, is capable of being quickly and easily incorporated into the polyolefin composition during the compounding of the latter.

It is surprising that the agents of this invention are so suitable when structurally related compounds are (1) unsatisfactory, especially as to difficulty of incorporation, (2) develop color during the compounding steps, and/or (3) are much less effective antistatic materials.

The agents of this invention (e.g., the methosulfate or ethosulfate) are used in ethylene and propylene homopolymers or copolymers and mixtures thereof in concentrations of about 0.2% to about 5.0%, with a preferred range being about 0.5% to about 2.0%, based on the weight of the polymer. They can be used alone or with other additives such as antioxidants, ultraviolet light absorbers, pigments, extenders, plasticizers, etc. In fact, it is an advantage of this invention that the ease and speed with which the antistatic agents are blended in the polymer substrate permits their addition to the polymer during the milling operation required for blending the other additives which it may be desired to use.

A conventional way to evaluate antistatic effectiveness in the polyolefin composition, is to measure resistivity. This involves determining the resistance (in megohms) to a predetermined voltage applied to the surface of the polymer sample. Lower resistivity values indicate better antistatic properties.

Suitability of the agent with respect to ease of incorporation into the polyolefin during the compounding process is determined by noting the time of milling necessary until incorporation is complete. Excessive amounts of time are undesirable.

The following examples are presented to further illustrate the present invention.

Example 1.—Lauramidopropyltrimethylammonium methosulfate

N-(3-dimethylaminopropyl)lauramide, 206 g., is dissolved in 200 cc. of acetone and 9.15 g. of dimethyl sulfate is added over a period of one hour to maintain reflux of the acetone. The mixture is heated for 30 minutes at reflux and cooled. An additional 250 cc. of acetone is added, and this mixture is heated to boiling, cooled and then filtered. The product is collected and after drying 25 mm. and 40° C. has a melting point of about 105–106° C.

This material is again recrystallized from acetone and treated with activated charcoal giving 189 g. of white crystals after drying under 255 mm. vacuum at room temperature for two days.

The corresponding ethosulfate is prepared by following the foregoing procedure identically except for the use of diethylsulfate instead of dimethylsulfate.

Example 2

(1) Sample preparation and incorporation time test.—The antistatic agent of Example 1 and others for purposes of comparison are individually incorporated into polyethylene by milling on a two-roll laboratory mill at 165 to 170° C., at a 1.5% concentration. The time of milling necessary for complete incorporation is observed. This is a measure of compatibility or suitability of the agent for practical use. Lower milling times are preferred.

The milled sheet is then compression-molded at 175° C. with 24 tons pressure into plaques of 2 x 2½ x 0.05 inches. These are then subjected to the resistivity test as described below.

(2) Resistivity measurements.—All samples are conditioned for 24 hours at 70° F. and 50% relative humidity and surface resistivity measurements are made according to a modified ASTM D–257–58 test using a Tera-Ohmmeter (Rhode and Schwartz Co.) at 900 volts.

Surface resistivity, expressed in megohms (instrument reading) is defined as the ratio of the direct voltage (900 volts) to the current on the surface of the polymer sample when the electrodes of the Tera-Ohmmeter are placed on opposite sides of the sample.

Low resistivity values indicate antistatic properties. The results are shown in the following table.

TABLE I

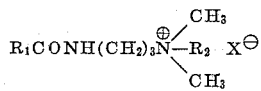

| Agent | R¹ | R² | X⁻ (Anion) | Resistivity | Initial Color | Time Required For Incorporation (minutes) |
|---|---|---|---|---|---|---|
| 1 [1] | $C_{11}H_{23}$ | $CH_3$ | $CH_3SO_4^-$ | $70 \times 10$ | None | 2 |
| A | $C_9H_{19}$ | Benzyl | $Cl^-$ | $30 \times 10^2$ | Light Yellow | 3 |
| B | $C_{13}H_{27}$ | $CH_3$ | $CH_3SO_4^-$ | $64 \times 10^2$ | None | 18 |
| C | $C_{17}H_{35}$ | $CH_3$ | $CH_3SO_4^-$ | $30 \times 10^3$ | ___do___ | 12 |
| D | $C_{17}H_{35}$ | 5 moles ethyleneoxide | $H_2PO_4$ | About $10^4$ | ___do___ | 9 |
| E | $C_{17}H_{35}$ | Hydroxyethyl | $NO_3^-$ | $36 \times 10$ | Trace Yellow | >10 |
| F | $CH_3$ | ___do___ | $NO_3^-$ | >$10^4$ | Tan | 9 |
| Control | | | | $35 \times 10^6$ | None | |

[1] This invention.

When the foregoing tests are conducted with polypropylene films, results are relatively the same. Similarly, the ethosulfate analog of the agent of Example 1 is as effective as the latter for the purposes of this invention.

From these data, it can be noted that only the agent of this invention satisfies all the requirements for an excellent antistatic agent.

Agent A, though easily incorporated, has much greater resistivity in polyolefins and imparts a yellow color thereto. All the remaining test agents, B–F, are very difficult to blend with polyolefins and, except for Agent E, have less advantageous antistatic effectiveness. Agent E imparts a yellow color to polyolefins.

We claim:
1. A polymeric composition having improved antistatic properties comprising a polymer of a 2–3 carbon olefin having dispersed therethrough from 0.2 to 5.0 weight percent of lauramidopropyl trimethylammonium lower alkyl sulfate.
2. The composition of claim 1 wherein lower alkyl is methyl.
3. The composition of claim 1 wherein the polymer is polyethylene.

References Cited

UNITED STATES PATENTS 2,626,877  1/1953  Carnes.
3,117,113  1/1964  Tudor.

JOSEPH L. SCHOFER, *Primary Examiner.*
L. EDELMAN, *Assistant Examiner.*

UNITED STATES PATENT OFFICE
CERTIFICATE OF CORRECTION

Patent No. 3,335,123                                    August 8, 1967

Thomas John Adams et al.

It is hereby certified that error appears in the above numbered patent requiring correction and that the said Letters Patent should read as corrected below.

Columns 3 and 4, TABLE I, fifth column, line 2 thereof, for "$30 \times 10^2$" read -- $30 \times 10^3$ --; same table, fifth column, line 4 thereof, for "$30 \times 10^3$" read -- $30 \times 10^2$ --.

Signed and sealed this 18th day of February 1969.

(SEAL)
Attest:

Edward M. Fletcher, Jr.                                  EDWARD J. BRENNER

Attesting Officer                                              Commissioner of Patents